Aug. 26, 1930.                J. G. GORDON                1,773,780
                                RIM TOOL
                            Filed Dec. 19, 1927
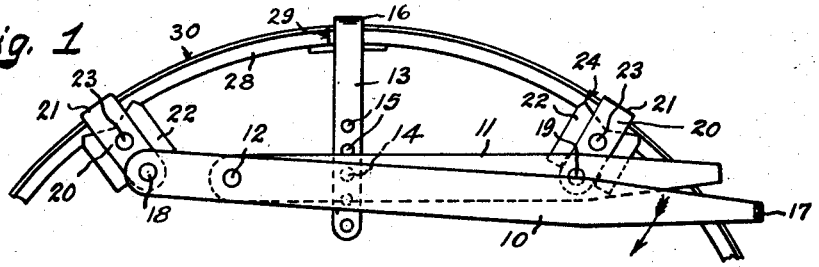
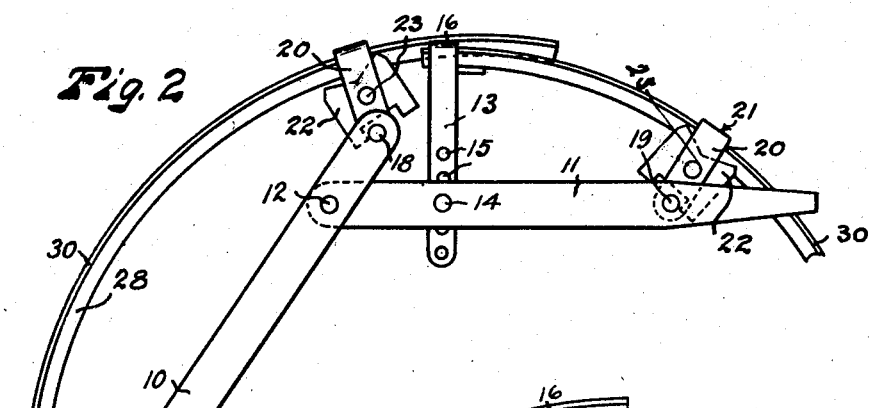
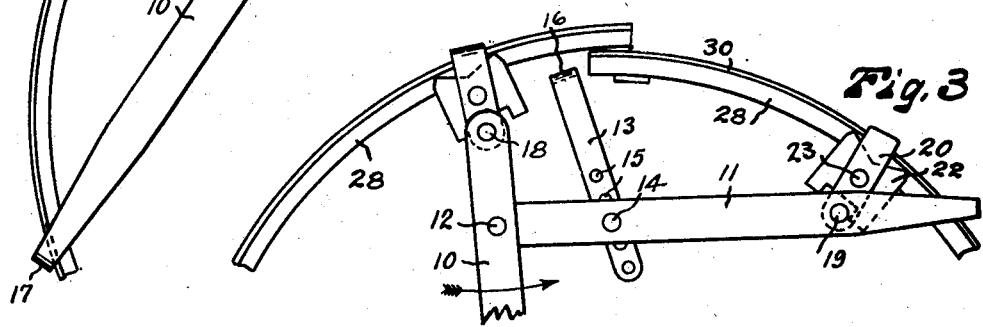
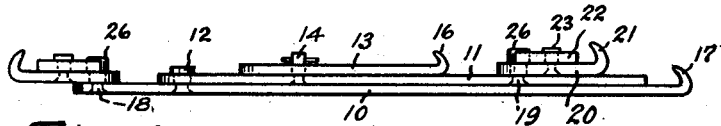
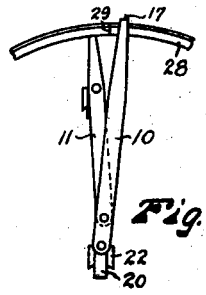
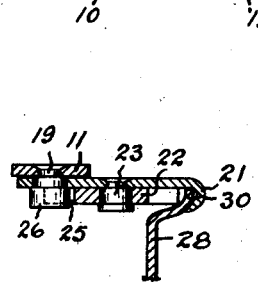
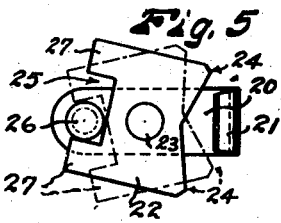
INVENTOR
Julius G. Gordon
BY
Fred G. Matheny
ATTORNEY Patented Aug. 26, 1930

1,773,780

UNITED STATES PATENT OFFICE

JULIUS G. GORDON, OF SEATTLE, WASHINGTON

RIM TOOL

Application filed December 19, 1927. Serial No. 241,002.

My invention relates to improvements in rim tools for contracting and expanding split rims and for holding the same contracted and the general object of my invention is to provide a simple and efficient tool by which a split rim may be quickly and easily contracted and held contracted to facilitate removing and applying a pneumatic tire to the rim, and, by which the rim may be expanded after a tire has been placed thereon.

Another object is to provide a rim tool having novel and efficient means for breaking or displacing the two abutting ends of a split rim preparatory to contracting the same.

A further object is to provide a rim tool embodying a novel combination of levers and novel clamp means for gripping the edge of a split rim and to provide a rim tool that is adjustable to rims of different size.

Other and more specific objects will be apparent from the following description taken in connection with the accompanying drawings.

In the drawings Fig. 1, is a view in elevation showing my rim tool applied to a split rim preparatory to contracting the same, a part only of the rim being shown.

Fig. 2 is a similar view showing the rim fully contracted.

Fig. 3 is another elevation showing the tool in the act of expanding the rim, a portion of the main operating lever being broken away.

Fig. 4 is a detached edge view of the tool.

Fig. 5, is a detached plan view on a larger scale of one of the rim clamps.

Fig. 6 is a somewhat diagrammatic elevation on a smaller scale showing the tool applied in a different manner for displacing or replacing the two ends of a split rim.

Fig. 7, is a section showing a clamp engaging a rim.

Like reference numerals designate like parts throughout the several views.

Referring to the drawings, I show a tool embodying a lever 10 and a link 11 both preferably formed of relatively strong flat metal, and disposed flatwise one against the other and interconnected by a pivot 12 which is positioned at the end of the link 11 and a short distance from the end of the lever 10. A rim breaking bar 13 is pivotally and adjustably connected with the link 11 by a stud pin 14 which is located a short distance from the pivot 12 and passes through any selected one of a plurality of holes 15 in the rim breaking bar 13. A hook 16, Fig. 4, is provided on the end of the rim breaking bar 13. A hook 17 is also provided on the outer, or handle end, of the lever 10.

Two rim clamps of duplicate construction are provided in connection with the tool, one of said clamps being connected by a pivot 18 with the end of the lever 10 a short distance from the pivot 12, and the other rim clamp being connected by a pivot 19 with the link 11 near the end remote from the pivot 12. The rim clamps each comprise a short flat metal bar 20 having one end pivoted on one of the above mentioned pivots 18 or 19 and having a hook 21 formed on the other end. A clamp plate 22 of greater width than the bar 20 is secured to said bar by a pivot 23. Rim engaging elements or points 24 are formed at the corners of the clamp plate 22 adjacent the hook, the edge of the plate between the points 24 being cut back toward the pivot 23, as more clearly shown in Fig. 5. The rear edge of the clamp plate 22 is recessed as at 25 to afford clearance for an enlarged head or stud 26 on the pivot 18 or 19 and to leave two lugs 27 on the clamp plate for engaging with opposite sides of the head 26 to limit the amount of pivotal movement of the plate 22 relative to the bar 20, as shown by full and dotted lines in Fig. 5. This insures a positive clamping engagement with a rim and keeps the clamp plate always approximately in place.

For contracting a split rim 28 of the form commonly used in connection with pneumatic tires the tool is applied to the rim, as shown in Fig. 1, by hooking the clamp hooks 21 over said rim at about equal distances on each side of the split 29 where the two ends of the rim abut against each other and by engaging the hook 16 of the rim breaking member 13 with one end of said rim 28 adjacent said split 29. When the tool is thus applied the lever 10 and link 11 will be substantially parallel with the lever 10 on the outside.

The lever 10 is then moved to the left as indicated by the arrow in Fig. 1, to first tighten the clamp on the out turned flange 30 at the outer edge of said rim, then to cause the rim breaking member 13 to exert a downward pull on one end of said rim, moving said two abutting ends into relatively offset relation and causing them to slip past each other, after which the lever 10 may be moved into the position shown in Fig. 2, to fully contract the rim, and the hook 17 on the end of said lever 10 may then be hooked over the edge of the rim to hold said rim contracted, as, for instance while a tire is being taken off and replaced by another or repaired and put back on. After a tire has been placed on the contracted rim the tool is released, allowing the rim to expand as much as it will and the clamp on the end of the lever 10 is adjusted closer to the split end of the rim with the levers in the position shown in Fig. 3. After this is done the lever 10 is moved to the right as indicated by the arrow, fully expanding the rim and permitting the ends to snap into abutting relation. This completes the work and the tool may be removed. The rim is usually provided with means, indicated by 31 for locking the two split ends together.

The clamps are strong and simple in construction and are easy to affix to, or disengage from a rim. Said clamps are positive and efficient in their operation, will grip the rim tightly in any position and will not slip on the rim.

In Fig. 6 I have shown the tool applied to a rim 28 with the hook 17 of the lever 19 hooked over one end of said rim near the split 29 and the end 32 of the lever 11 abutting squarely against the other end of said rim on the other side of the split 29. When the tool is thus applied it may be used as a lever to displace the ends of the rim or to bring said ends into correct alignment in an obvious manner.

The tool is simple in construction, not expensive to manufacture, reliable and efficient in operation, easy and quick to manipulate and capable of being folded into a very compact form when not in use.

The foregoing description and accompanying drawings clearly disclose a preferred embodiment of my invention but it will be understood that this disclosure is merely illustrative and that such changes in the invention may be made as are fairly within the scope and spirit of the following claim.

I claim:

In a rim tool, a lever, a rim clamp connected with the inner end thereof, a link having one end pivoted to the lever a short distance from the point of connection of the rim clamp, another rim clamp connected with the free end of said link and a rim breaking bar pivotally and adjustably connected with the link a short distance from the pivoted end thereof and having a hook on its outer end adapted to engage with the end of a split rim adjacent the split.

The foregoing specification signed at Seattle, Wash., this 15th day of Dec. 1927.

JULIUS G. GORDON.